United States Patent [19]
Morrow

[11] Patent Number: 5,148,992
[45] Date of Patent: Sep. 22, 1992

[54] WASHING ACCESSORY FOR A STRING TRIMMER

[75] Inventor: John A. Morrow, Fort Mill, S.C.

[73] Assignee: Textron Inc., Providence, R.I.

[21] Appl. No.: 671,956

[22] Filed: Mar. 19, 1991

[51] Int. Cl.⁵ .............................................. B05B 15/00
[52] U.S. Cl. .................................. 239/289; 239/310; 15/328
[58] Field of Search ............... 239/289, 310, 332, 525, 239/526, 456; 15/328; 417/234; 418/206

[56] References Cited

U.S. PATENT DOCUMENTS

| | | | |
|---|---|---|---|
| D. 291,113 | 7/1987 | Bauer | D23/226 |
| 1,299,785 | 4/1919 | Sartor | 15/29 |
| 1,507,349 | 9/1924 | Franz | 15/29 |
| 1,537,273 | 5/1925 | Tully | 15/103 |
| 1,578,013 | 3/1926 | Case | 15/29 |
| 1,604,500 | 10/1926 | Tannenbaum | 15/29 |
| 1,980,460 | 11/1934 | White | 239/456 |
| 2,651,795 | 9/1953 | Kilgore | 15/29 |
| 3,500,490 | 3/1970 | Teren | 15/97.1 |
| 3,885,739 | 4/1975 | Tuttle | 239/124 |
| 4,151,624 | 5/1979 | Montalvo | 15/23 |
| 4,208,753 | 6/1980 | Lewis | 15/29 |
| 4,242,794 | 1/1981 | Peterson | 30/122 |
| 4,501,332 | 2/1985 | Straayer | 172/41 |
| 4,752,256 | 6/1988 | Dorion | 440/49 |
| 4,780,992 | 11/1988 | McKervey | 51/180 |
| 5,024,384 | 6/1991 | Redmon et al. | 239/289 |
| 5,040,950 | 8/1991 | Dalquist, III et al. | 418/206 |

FOREIGN PATENT DOCUMENTS 0312862 10/1988 European Pat. Off. .

Primary Examiner—Andres Kashnikow
Assistant Examiner—Lesley D. Morris
Attorney, Agent, or Firm—Perman & Green

[57] ABSTRACT

A pressure washer attachment for a string trimmer. The attachment has a housing and a liquid accelerating pump. The housing is adapted to be connected to a shaft of the string trimmer with the pump connected to a motor of the string trimmer. A liquid supply hose can be connected to the attachment such that the string trimmer motor can operate the pump to accelerate the liquid as it is discharged from the attachment for cleaning or washing.

16 Claims, 2 Drawing Sheets

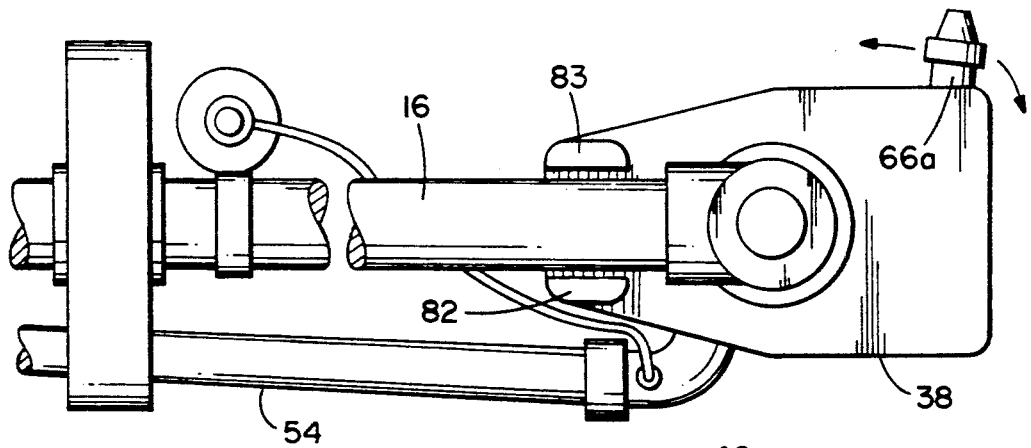
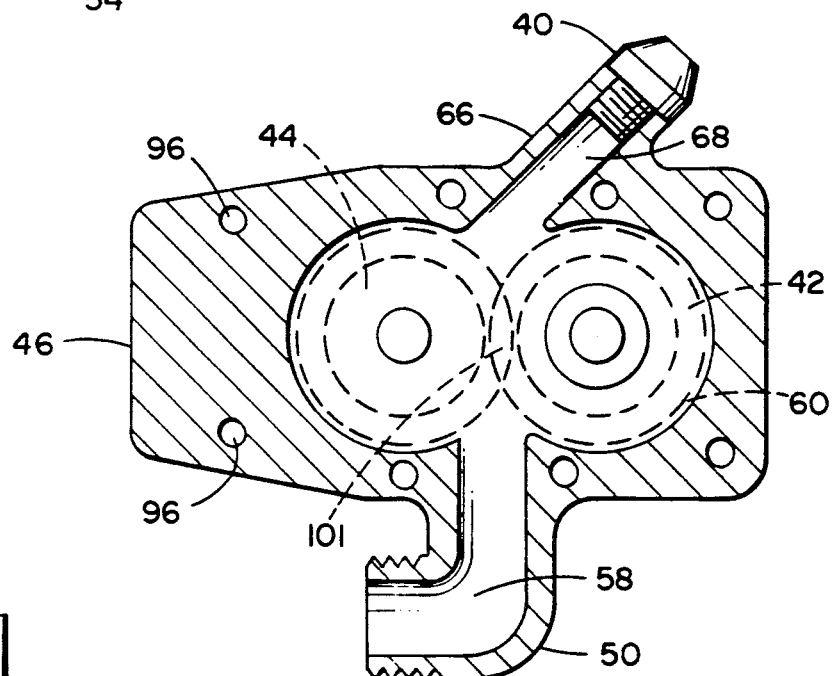

WASHING ACCESSORY FOR A STRING TRIMMER

FIELD OF THE INVENTION

The present invention relates to cleaning and washing and, more particularly, to a liquid washer attachment for a string trimmer.

PRIOR ART

String trimmers are generally known and used for cutting and trimming grass and vegetation. Such apparatus typically comprise a compact internal combustion motor mounted at one end of a hollow casing which carries at an opposite end thereof a vegetation cutting tool such as a cutting head with a plurality of flexible strings or a metallic circular blade for heavy duty works. The internal combustion motor drives the blade or the cutting head by means of an elongated drive shaft contained in the hollow casing. The lower end of the drive shaft is connected to the vegetation cutting tool by a coupling such as an universal joint. String trimmers with electric motors are also known.

In recent years, attempts have been made to convert commercially available vegetation trimming apparatus into devices to perform other functions. For example, United States Patent to Peterson, U.S. Pat. No. 4,242,794, granted on Jan. 6, 1981 relates to a blower attachment unit to be mounted on a flexible line type weed trimming apparatus, to convert the trimming apparatus into a blower for sweeping sidewalks or other surfaces of clippings and the like.

Also, United States patent to Straayer, U.S. Pat. No. 4,501,332 granted on Feb. 25, 1985, teaches an adapter for converting a portable apparatus for cutting and trimming vegetation into an earth cultivating device. United States patent to Dorion, U.S. Pat. No. 4,752,256 granted Jan. 21, 1988, discloses an adapter for converting a trimming apparatus into a device for propelling a boat. U.S. Pat. No. 4,780,992 to McKervey discloses an apparatus for cleaning pool tile with a body of a string trimmer and an abrasion member.

U.S. Pat. No. 3,885,739 to Tuttle discloses a pressure fluid cleaning device. U.S. Design Pat. No. DES 291,113 to Bauer discloses a spray gun. European Patent Office Patent 312,862 discloses a high pressure apparatus.

However, there has not been provided in the prior art, and it is an objective of the present invention to provide, an attachment for use with a string trimmer for use in liquid pressure washing.

SUMMARY OF THE INVENTION

The foregoing problems are overcome and other advantages are provided by a pressure washer attachment for a string trimmer apparatus and a method of converting a string trimmer apparatus into a liquid pressure washer.

In accordance with one embodiment of the present invention, a liquid washing apparatus is provided comprising a frame, a motor, a drive shaft, and a working end. The frame has a general elongate shape. The motor is connected to the frame. The drive shaft is operatively connected to the motor. The working end has a housing with an internal chamber, a liquid inlet into the chamber, a liquid outlet out of the chamber, and means for accelerating liquid entering the housing at the inlet to discharge the liquid from the outlet at an increased velocity. The working end is connected to the drive shaft. The means for accelerating includes a pump located in the chamber and operably connected to the drive shaft such that the motor can drive the pump to discharge liquid from the outlet at an increased velocity.

In accordance with another embodiment of the present invention, a pressure washer attachment for a string trimmer apparatus is provided. The attachment comprises a housing having an internal cavity, a liquid inlet communicating with the internal cavity, and a liquid outlet also communicating with the internal cavity. Means are provided for connecting the housing to a shaft of the apparatus. Means are also provided for connecting a liquid supply hose to the liquid inlet. The attachment further comprises means located in the internal cavity for accelerating liquid entering the housing at the inlet to discharge the liquid from the outlet at an increased velocity.

In accordance with one method of the present invention, a method of converting a string trimmer apparatus into a liquid pressure washer is provided. The method comprises steps of removing a string cutter from a frame and drive shaft of the string trimmer apparatus; connecting an accelerator to the frame and drive shaft, the accelerator having a housing with an inlet, an outlet, and an internal cavity between the inlet and outlet and, a liquid accelerating pump in the internal cavity. The housing is connected to the frame, and the accelerating pump is connected to the drive shaft. The method further comprises the step of connecting a liquid supply to the inlet such that the liquid entering the housing from the liquid supply can be accelerated and discharged from the outlet at an elevated velocity.

BRIEF DESCRIPTION OF THE DRAWINGS

The foregoing aspects and other features of the present invention are explained in the following description, taken in connection with the accompanying drawings, wherein:

FIG. 3 is a plan top view of an alternate embodiment of the pressure washer attachment of the apparatus shown in FIG. 1.

FIG. 4 is a cross-sectional view of the upper housing for the pressure washer attachment shown in FIG. 1.

FIG. 5 is a cross-sectional side view of the pressure washer attachment shown in FIG. 1.

DETAILED DESCRIPTION OF THE INVENTION

Figure 1:
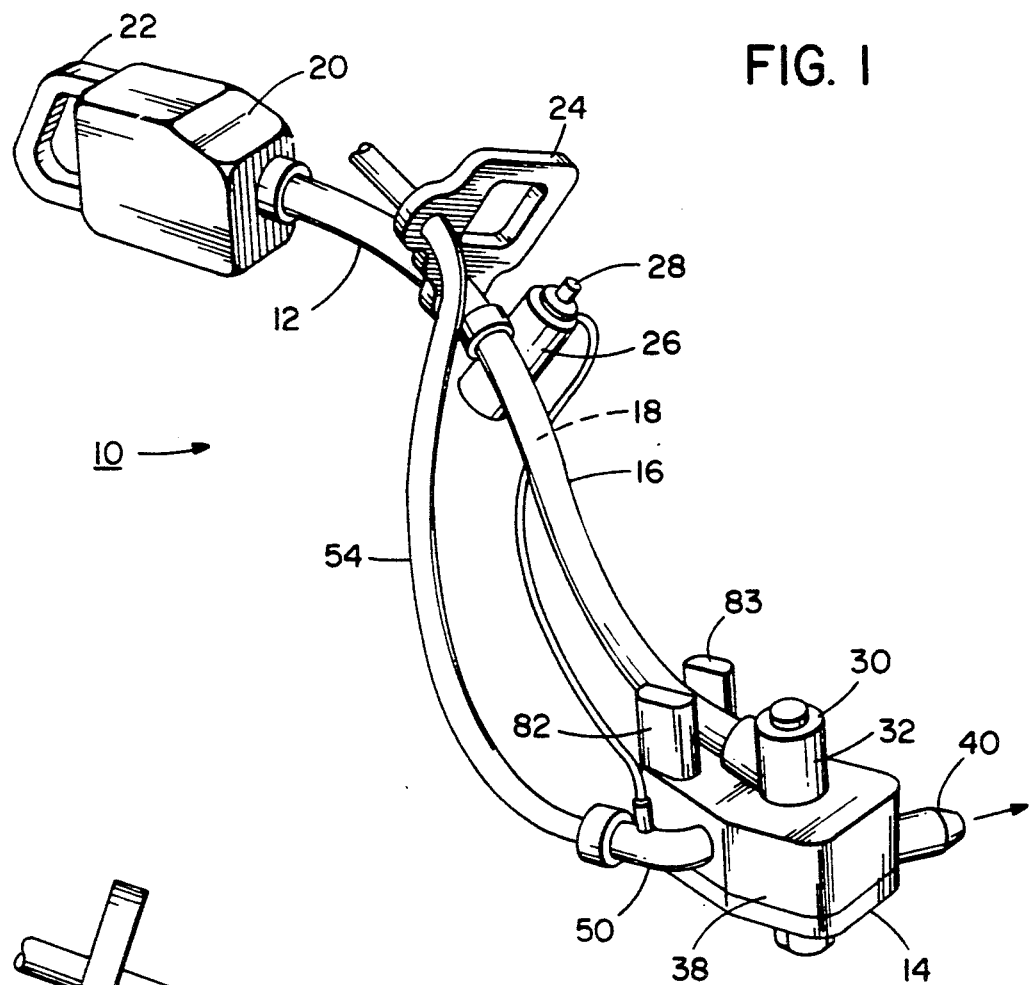
FIG. 1 is a perspective view of a liquid washing apparatus incorporating features of the present invention.

FIG. 1 shows a liquid washing apparatus 10 incorporating features of the present invention. Although the present invention will be described with reference to the embodiments shown in the drawings, it should be understood that the present invention may be incorporated into any suitable type of embodiment. In addition, any suitable size, shape or type of elements or materials can be used.

The apparatus 10, in the embodiment shown, generally comprises a string trimmer unit 12 and a pressure washer attachment 14. The string trimmer unit 12 is a conventional type trimmer that has its string cutting head (not shown) removed. The unit 12 has a frame 16, a drive shaft 18, and a motor 20. In the embodiment shown, the motor 20 is comprised of an internal combustion engine that is connected to the rear end of the frame 16. However, any suitable type of motor might be provided including an electric motor at either the front or rear of the frame 16. The motor 20 is operably connected to the rear of the drive shaft 18. The frame 16 also has a rear handle 22 and a front handle 24 such that an operator can properly manipulate the apparatus. Also connected to the frame 16 is a soap container 26 with a top dispensing button 28. The front end of the frame 16 and drive shaft 18 terminate at a front end 30 of the unit 12. The front end 30 has a housing 32 connected to the frame 16 and a second drive shaft 34 (see FIG. 2) operably connected to the first drive shaft 18. A removable fastening nut 36 is connected to the end of the second drive shaft 34. Although the string trimmer unit 12 has been described in detail above, it should be understood that the present invention can be used with any suitable type of string trimmer unit.

Figure 2:
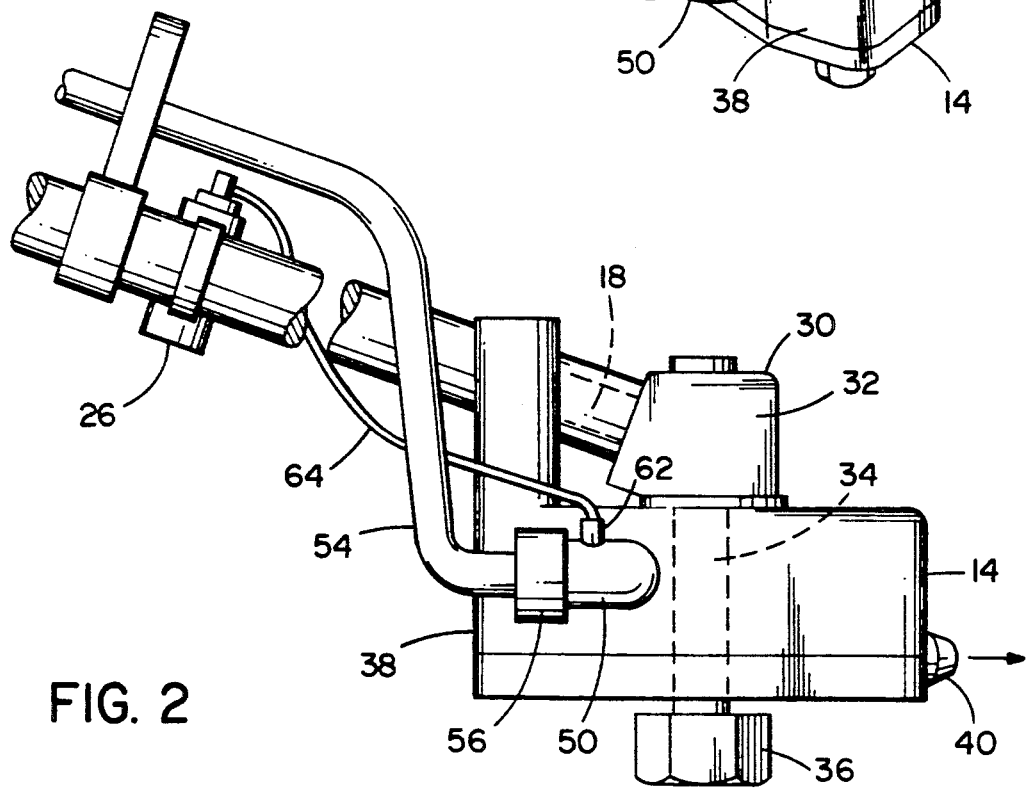
FIG. 2 is a plan side view of the front end of the apparatus shown in FIG. 1 showing the pressure washer attachment.

Referring also to FIGS. 2, 4 and 5, the pressure washer attachment 14 is generally comprised of a housing 38, an adjustable nozzle 40, a drive gear 42 and an idler gear 44. The housing 38 can be comprised of any suitable material or combination of materials including metal or plastic and has a top member 46 with a bottom member 48 connected thereto. The top member 46 has a liquid inlet 50 with threads 52. The threads 52 are provided such that a hose 54 having an end coupling 56, such as a garden hose, can be connected to the inlet 50. The inlet 50 has a conduit 58 that communicates with an interior cavity 60. The inlet 50 also has a mount 62 for connecting a soap tube 64 to the inlet. The soap tube 64 can thus supply soap or other cleanser from the container 26, through the tube 64 and into the conduit 58 to mix with water from the garden hose 54. The interior cavity 60 is adapted to rotatably receive the two gears 42 and 44 therein. The upper housing also has an outlet 66 with a conduit 68 passing therethrough. In the embodiment shown, the inlet 50 is relatively larger than the outlet 66. The adjustable nozzle 40 is connected to the end of the outlet 66. In the embodiment shown, the outlet 66 is integrally formed with the upper housing 46 and thus, only the nozzle 40 is movable. However, in an alternate embodiment, as shown in FIG. 3, the outlet 66a may be provided as movable relative to the housing top member 46. The nozzle 40 may also be removably connected to the housing 38 such that nozzles with different spray patterns can be used.

The top member 46 of the housing 38 has an aperture 70 and a seat 72. A seal/bearing member 74 is located in the seat 72. The drive gear 42 has a top portion 76 that extends up from the interior cavity 60 through the aperture 70 and a hole in the member 74. The housing top member 46 also has a recess 78 for locating one end of a bearing pin 80 therein. The interior cavity 60 has a general dual intersecting circular profile (as seen best in FIG. 4) with the conduits 58 and 68 projecting towards and away from the intersection. Located on the top of the top member 46 are two spaced members 82 and 83 that function as a stabilizer yoke for stabilizing the housing 38 relative to the frame 16 to prevent rotation of the housing 38 relative to the frame 16. A portion of the frame 16 is intended to be positioned between the two members 82 and 83. However, any suitable type of stabilizing yoke or anti-rotation device could be provided.

The bottom member 48 of the housing 38 has a gear aperture 84 passing therethrough. A bottom portion 86 of the drive gear 42 passes through the aperture 84. The bottom member 48 also has a seat 88 at the aperture 84 for receiving a seal/bearing member 90. A recess 92 is located on the top side of the bottom member 48 to receive an end of the bearing pin 80. The bottom member 48 also has a plurality of screw holes 94 that are aligned with screw holes 96 in the top member 46 such that screws 98 can be used to fixedly mount the bottom member 48 to the top member 46.

The drive gear 42, in addition to its top portion 76 and bottom portion 86, has a center portion 100 located in the interior cavity 60. The center portion 100 has gear teeth 102. The drive gear 42 also has a center channel or hole 104 that is adapted to receive the second drive shaft 34 such that as the second drive shaft 34 is turned, the drive gear 42 is turned in the housing 38. The idler gear 44 has a center portion 106 with a channel or hole 108. The bearing pin 80 is located in the channel 108 and allows the idler gear 44 to rotate about the axis of the pin 80. The idler gear 44 also has gear teeth 110. The gear teeth 102 and 110 are intended to intermesh with each other at the intersection 101 as the gears 42 and 44 are rotated. The teeth are adapted to act as impellers to increase the pressure against liquid entering the interior cavity 60 for discharge at the nozzle 40 at an elevated velocity.

As stated above, the attachment 14 is generally intended to be used as an accessory attachment to a string trimmer. In order to convert a string trimmer into the liquid pressure washer, the string cutting head is removed from the front end 30. This is accomplished by removing the nut 36. the string cutting head then can merely be slid off of the second drive shaft 34. The attachment 14 can then be connected to the front end 30 of the unit 12. The second drive shaft 34 is located in the center channel 104 of the drive gear 42, the members 82 and 83 of the stabilizer yoke are positioned on opposite sides of the frame 16, and the nut 36 is reattached to the second drive shaft 34 to fixedly mount the accelerator head 14 to the unit 12. The hose 54 and soap tube 64 can then be attached to the housing inlet 50.

The operation of the apparatus 10 is relatively simple. Liquid, such as pressurized water, is supplied by the hose 54 to the accelerator head 14. The motor 20 is used to turn the first drive shaft 18, which turns the second drive shaft 34. The second drive shaft 34 drives the drive gear 42. The teeth 102 of the drive gear 42 drive the teeth 110 of the idler gear 44 to rotate the idler gear 44. The idler gear 44 functions to help define a path for the liquid flowing through the cavity 60 and functions to accommodate the teeth 102 of the drive gear 42 for optimum performance. The teeth of the drive gear and idler gear increase the pressure applied to the liquid which causes the pressure against the liquid in the outlet conduit 68 to be greater than the pressure against the liquid in the inlet conduit 58. This causes the liquid to be discharged from the nozzle 40 at an elevated velocity to be used for washing or cleaning purposes. The nozzle 40 can be adjusted between a stream setting or a spray setting. The motor 20 has a suitable throttle to increase and decrease the speed of the motor 20, thus increasing and decreasing the velocity of liquid being discharged from the nozzle 40. The accelerator head 14 may also include suitable means for stopping the flow of liquid from the nozzle 40 when desired.

Let it be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. A liquid washing apparatus comprising:
   a frame having a general elongate shape;
   a motor connected to a first end of said frame;
   a drive shaft extending through said frame from said frame first end to a frame second end, said drive shaft being operably connected to said motor; and
   a working end having a housing removably connected to said frame second end, said housing having an internal chamber, a liquid inlet into said chamber, and a liquid outlet out of said chamber, and said working end further comprising means for accelerating liquid entering said housing at said inlet to discharge the liquid from said outlet at in increased velocity, said means for accelerating including a pump located in said chamber and being operably connected to said drive shaft such that said motor can drive said pump to discharge liquid from said outlet at an increased velocity.

2. An apparatus as in claim 1 wherein said liquid inlet includes means for connecting a garden hose to said housing.

3. An apparatus as in claim 2 wherein said liquid inlet includes means for connecting a liquid soap tube to said housing.

4. An apparatus as in claim 1 wherein said housing includes an upper housing and a lower housing.

5. An apparatus as in claim 1 wherein said means for accelerating liquid includes a driven gear connected to said drive shaft.

6. An apparatus as in claim 5 wherein said means for accelerating liquid includes an idler gear rotatably mounted in said housing and operably connected to said driven gear.

7. An apparatus as in claim 1 further comprising means for removably mounting said working end with said frame and drive shaft.

8. A pressure washer attachment for a string trimmer apparatus, the attachment comprising:
   a housing having an internal cavity, a liquid inlet communicating with said internal cavity, and a liquid outlet communicating with said internal cavity;
   means for removably connecting said housing to an end of a shaft of the apparatus;
   means for connecting a liquid supply hose to said liquid inlet including a threaded end on said inlet for connecting a garden hose thereto; and
   means, located in said internal cavity, for accelerating liquid entering said housing at said inlet to discharge the liquid from said outlet at an increased velocity.

9. An attachment as in claim 8 wherein said means for connecting said housing to a shaft includes said housing having a stabilizer yoke, and said housing and means for accelerating include an aperture for positioning a portion of the apparatus shaft therein.

10. An attachment as in claim 8 wherein said housing inlet also comprises means for connecting a soap tube thereto.

11. An attachment as in claim 8 wherein said housing includes an adjustable nozzle at said outlet.

12. An attachment as in claim 8 wherein said means for accelerating includes a driven gear in said cavity adapted to be connected to a drive shaft extending from the shaft of the apparatus.

13. An attachment as in claim 12 wherein said means for accelerating includes an idler gear operably connected to said driven gear in said cavity.

14. An attachment as in claim 8 wherein said inlet is relatively larger than said outlet.

15. A method of converting a string trimmer apparatus into a liquid pressure washer, the method comprising steps of:
   removing a string cutter from a frame and drive shaft of the string trimmer apparatus;
   connecting an accelerator to the frame and drive shaft, the accelerator having a housing with an inlet, an outlet, and an internal cavity between the inlet and outlet and, a liquid accelerating pump in the internal cavity, the housing being connected to the frame and the accelerating pump being connected to the drive shaft, the housing having a stabilizer yoke that is aligned with the frame to prevent the housing from axially rotating relative to the frame; and
   connecting a liquid supply to the inlet such that liquid entering the housing from the liquid supply can be accelerated and discharged from the outlet at an elevated velocity.

16. A method as in claim 15 wherein the step of connecting an accelerator tot he frame and drive shaft includes positioning a portion of the drive shaft through a hole in the housing and into operable engagement with a driven gear of the accelerating pump.

* * * * *